E. W. BULLARD.
Hay Spreader.
No. 32,350.  Patented May 21, 1861.
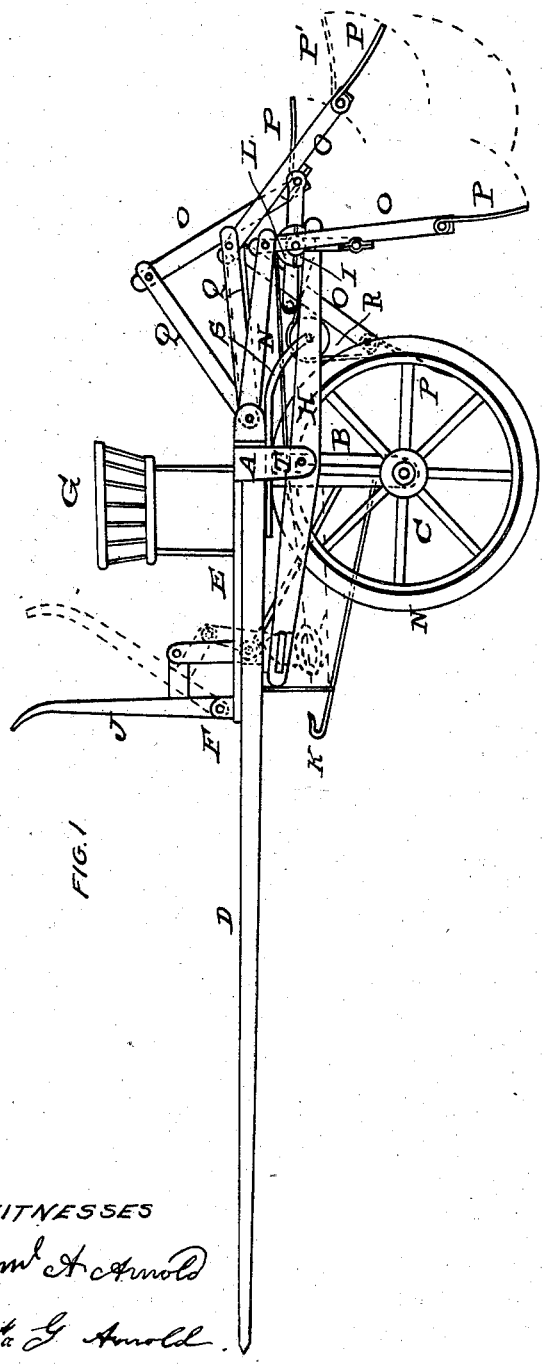
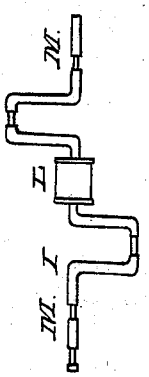
WITNESSES
INVENTOR

UNITED STATES PATENT OFFICE.

E. W. BULLARD, OF BARRE, MASSACHUSETTS.

IMPROVEMENT IN MACHINES FOR TURNING AND SPREADING HAY.

Specification forming part of Letters Patent No. 32,350, dated May 21, 1861.

*To all whom it may concern:*

Be it known that I, E. W. BULLARD, of Barre, in the county of Worcester and State of Massachusetts, have invented a new and useful Hay Spreader and Turner for Spreading and Turning Hay and Similar Purposes; and I do hereby declare that the following is a full, clear, and exact description of the same, reference being had to the accompanying drawings, and to the letters of reference marked thereon.

Figure 1 (see drawings) is a side view or elevation; Fig. 2, a plan of one of the crank-shafts; and Fig. 3 shows two views of the fork tines or prongs, the same letters indicating the same parts in all.

A is the cross-bar, supported by the uprights B from the axle-tree of the wheels C. D are the thills for a single horse, or to be replaced by a pole for two abreast; E, planking from A to F; G, seat for driver; H, lever or side of frame for supporting the crank-shafts I, the frame being hung from A, and connected in front to lever J, so that by moving J toward the seat, as shown by the dotted lines, it depresses the fore part of the frame and raises the back part, with the shafts and forks; and by pressing J from the seat it raises the fore part and holds down the back, holding the forks down to their work when needed. K is the draft-hook. I is the crank-shaft to operate the forks, having a crank for each one, arranged to bring the forks to the ground successively; L, pulley by which the belt N drives shaft I; M M, bearings on which it turns in boxes on H; O O O O, forks with the tines or prongs P attached to their lower ends, and having their upper ends pivoted to the swinging holders Q Q Q Q, which are jointed to bar A. Each fork is provided with a box or clasp for its crank to be held in, to give it motion. The prongs P are made by first making a loop in the middle of the piece large enough to pass half round the stem or handle, then winding a short coil on each side and bringing the ends down, as shown in Fig. 3; and they are fastened by a pin passing through the coils, which is so placed that when their points are on a line of the stem, or nearly so, the loop rests against its back, holding them from turning farther back, except by their spring, and yet allowing them to turn forward loosely, as shown at P'. The wheel C is made to carry the belt N, to operate the forks. R is a tightening-pulley on the slip S, which is slotted and held to bar A by bolt and nut T, each wheel having its belt, crank-shaft, forks, &c.; or both may be made to drive one.

In operation the machine is driven over the cut grass, the wheels, by the belts, driving the crank-shafts, which give the lower ends of the forks an oval motion, bringing their points to the work a little behind the wheels, and they pick up the hay and throw it back or turn it over, each fork in its turn, the velocity given causing each fork to work over the whole of its line of surface; and on their return motion the loose hang of the prongs leaves them free and prevents their catching, and allows the machine to be backed, when necessary. If the work is very heavy, the driver, by placing his foot against J, holds the forks down, and by pulling it toward him elevates them.

It is evident that many variations of the form and proportion of the parts, as well as the number of them and forks, may be made without departing from the principles of my invention, as I do not claim any particular form or arrangement; but

What I claim is—

1. Giving a number of forks arranged to operate successively a backward and forward motion, by means of the crank-shaft or similar mechanism, when constructed and operating substantially in the manner and so as to accomplish the purposes above set forth.

2. The prongs P, when constructed as described and used in combination with the arms or forks O, in the manner and for the purpose specified.

In witness whereof I have hereunto set my hand in the presence of two witnesses.

E. W. BULLARD.

Witnesses:
SAML. A. ARNOLD,
JAS. G. ARNOLD.